United States Patent [19]
Pramstraller et al.

[11] 3,843,254
[45] Oct. 22, 1974

[54] ENLARGING APPARATUS WITH LENSES OF VARYING FOCAL LENGTH AND AUTOMATIC FOCUS THEREFOR

[75] Inventors: Wilmuth Pramstraller; Hansjorg Stampfer, both of Brixen, Italy

[73] Assignee: Durst AG, Bozen, Italy

[22] Filed: Oct. 17, 1973

[21] Appl. No.: 407,163

[30] Foreign Application Priority Data
Oct. 20, 1972 Italy................................ 30704/72

[52] U.S. Cl..................... 355/56, 350/39, 352/140, 355/58
[51] Int. Cl. .......................................... G03b 27/40
[58] Field of Search ............ 355/56, 58, 59; 350/39; 352/140

[56] References Cited
UNITED STATES PATENTS
| | | | |
|---|---|---|---|
| 2,889,741 | 6/1959 | Luz...................................... | 355/58 |
| 2,985,066 | 5/1961 | Hauptvogel et al................... | 355/58 |
| 3,600,066 | 8/1971 | Del Vecchio........................ | 355/58 X |

FOREIGN PATENTS OR APPLICATIONS
1,041,135   9/1966   Great Britain....................... 355/58

*Primary Examiner*—Richard A. Wintercorn
*Attorney, Agent, or Firm*—Connolly and Hutz

[57] ABSTRACT

A photographic enlarger has two lenses of different focal length mounted on a sliding carriage. The carriage is slid into a position which aligns the selected lens with the optical axis. The selected lens is positioned at the proper focal distance by movement of the lens carrier in the direction of the optical axis by the guidance of a roller on the lens carriage in a slotted guide plate. The guide plate is angularly positioned by an automatic focusing mechanism, having a pair of parallel rods movably connected to its ends. The roller is urged into its extremities of travel corresponding to the two different lenses by a toggle spring. The lens carrier upon which the lens carriage slides is coupled to move longitudinally relative to the projection head by sliding sleeves on columns.

14 Claims, 6 Drawing Figures

ENLARGING APPARATUS WITH LENSES OF VARYING FOCAL LENGTH AND AUTOMATIC FOCUS THEREFOR

BACKGROUND OF THE INVENTION

This invention relates to a photographic enlarger having an automatic mechanism for maintaining the proper focal distance of lenses of different focal length. The lenses are accommodated in a lens carriage which is movable at right angles to the optical axis of the projection head of the enlarger.

There are known positioning devices in which two lenses are mounted in a swiveling lens carriage. When the elevation of the projection head is adjusted, both of these lenses are coordinated in such a manner that they remain in proper focus in any position of the projection head regardless of which of the lenses is being utilized. Because both of the lenses must be simultaneously coordinated, the control profiles of the automatic focusing device are unduly stressed. Furthermore, very precise and expensive mechanisms are required to accurately position the lenses in the swiveling mount whose construction and assembly are extremely expensive.

In another existing automatic positioning device, the lenses are mounted on a sliding carriage which is movable at right angles to the optical axis and which thus avoids some of the aforementioned disadvantages. However, the procedure in switching over from a lens of one focal length to another is very awkward because the lens carriage must be raised to disengage and reengage it with the particularly required control profile of the focusing device. Furthermore, the lens switching device is very complicated in parts and assembly and is very expensive.

An object of this invention is to provide a lens positioning device for a photographic enlarger which avoids the aforementioned disadvantages and to provide a switching device for a photographic enlarger having at least two lenses of different focal length and an automatic focusing mechanism which may be obtained with relatively simple construction, with lenses which may be changed in any working position of the projection head and in which the automatic focusing is always automatically accomplished when the selected lens is actuated into the operative position.

SUMMARY

In accordance with this invention the lenses are mounted on a lens carriage which is movable at right angles to the optical axis in order to move the selected lens in line with the axis. At least two lenses of different focal length are mounted on the carriage which is connected to a slotted guide plate by engagement of a pin with the slot in the plate. The position of the plate and its angle of tilt are determined by an automatic focusing mechanism which may be connected through a pair of parallel rods to the ends of the plate. The pin may comprise a roller which is urged into its extremities of travel by a toggle spring. The lens carrier upon which the carriage may be slidably mounted may be connected to move longitudinally relative to the projection head by guide rods and sleeves, whose ends also define the limits of travel of the carrier.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which.

DESCRIPTION OF THE PREFERRED EMBODIMENT

Figure 1:
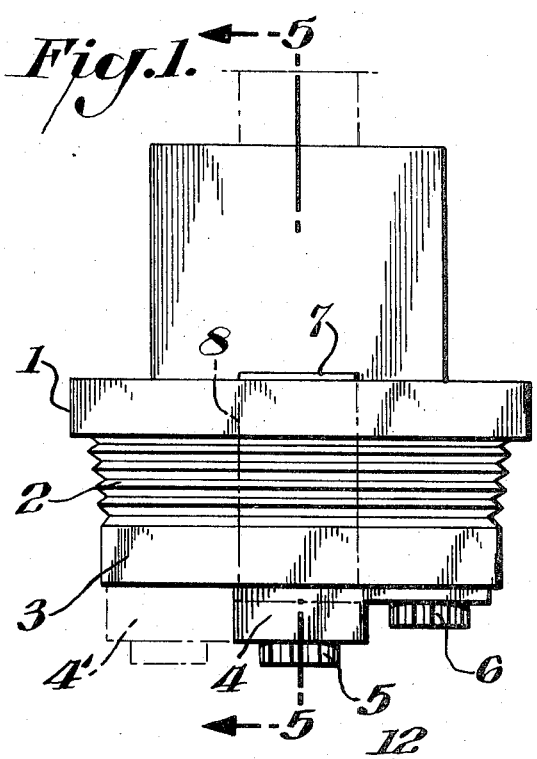
FIG. 1 is a front elevational view of the projection head, lens carrier, and part of a support column of a photographic enlarger incorporating one embodiment of this invention.
Figure 2:
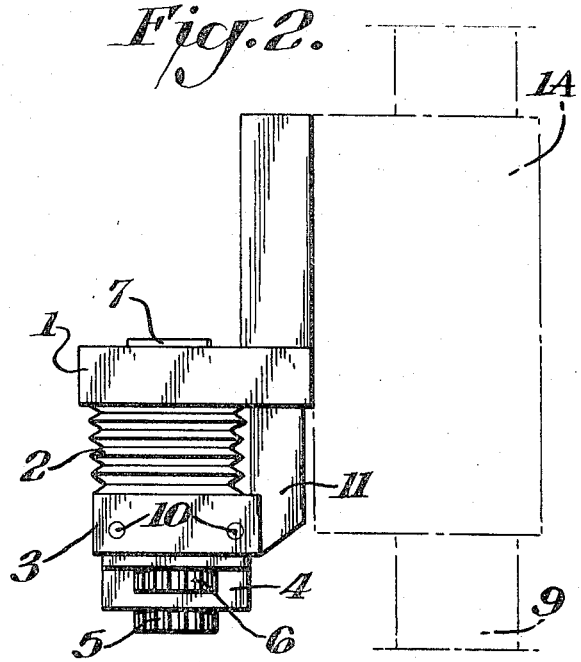
FIG. 2 is a right side elevational view of the apparatus shown in FIG. 1.
Figure 3:
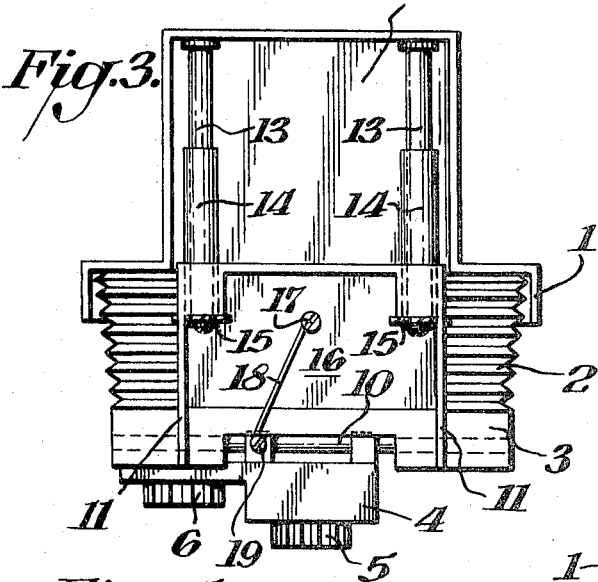
FIG. 3 is a rear elevational view of the projection head and lens carrier of the apparatus shown in FIGS. 1 and 2.
Figure 4:
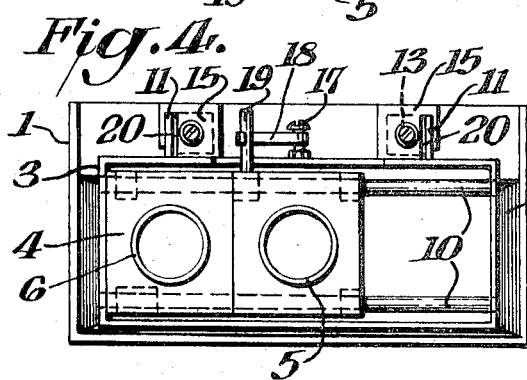
FIG. 4 is a bottom plan view of the apparatus shown in FIG. 3.
Figure 5:
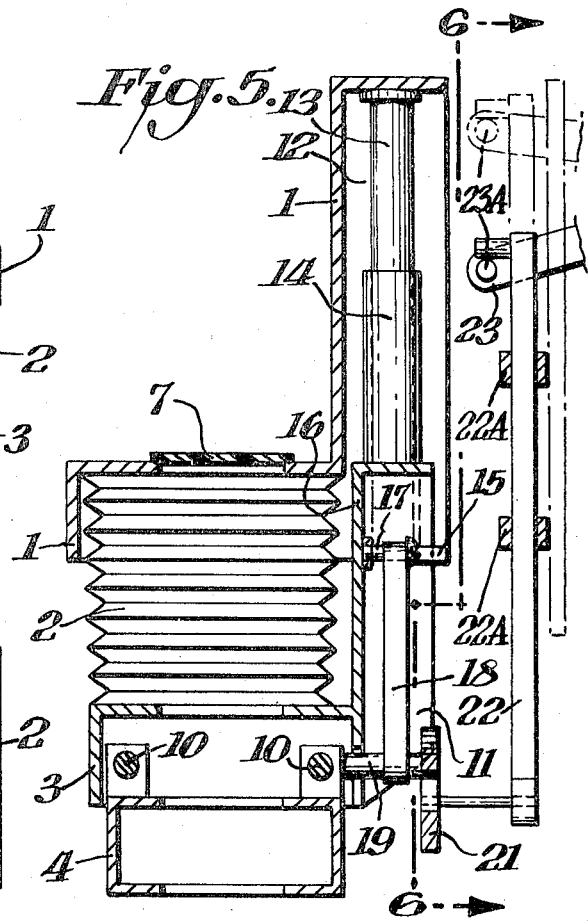
FIG. 5 is an enlarged cross-sectional view taken through FIG. 1 along the line 5—5.

In FIGS. 1–5 is schematically illustrated negative or transparency holder 1 which is a constituent of the projection head of a photographic enlarger, which is otherwise not illustrated. Negative or transparency holder 1 is longitudinally movable on support 9 of the photographic enlarger by engagement of holder extension 1A, which is schematically illustrated.

Negative holder 1 is connected by bellows 2 to lens carrier frame 3. Lens carriage 4 is movably connected to carrier frame 3, as later described, and it accommodates two lenses 5 and 6 of different focal length. Lens carriage 4 moves, from the position shown in solid outline in which lens 5 is disposed in the optical axis of the projection head in the path of the projected rays of light 8, to the position illustrated by broken outline and designated 4' in which lens 6 is positioned along the optical axis and in the path of the projected rays 8.

The negative or transparency to be copied (not illustrated) is placed on negative plane 7, which is also schematically illustrated. Lens carrier frame 3 includes a pair of parallel horizontal guide rods 10 along which lens carriage 4 with its lenses 5 and 6 is slid back and forth.

Angle brackets 11 are attached to the sides of lens carrier frame 3 on the side facing support column 9. Angle brackets 11 are longitudinally movable relative to negative holder 1 as later described. The term "longitudinally movable" herein means along or parallel to the optical axis. The rear side of negative holder 1 contains hollow space 12 within which are mounted a pair of parallel guide columns 13 disposed vertically with respect to the projection plane and parallel to the optical axis. The upper ends of guide columns 13 are attached to the top of the housing of negative holder 1. Sliding tubular sleeves 14 are mounted about guide columns 13 and have their lower ends connected to an enlargement of angle brackets 11, which are attached to lens carrier frame 3.

The lower ends of guide columns 13 are supported on base plates 15, which are secured to the housing of negative holder 1. Plates 15 simultaneously serve as the lower stop of sliding tubular sleeves 14 which move up and down on guide columns 13. Base plates 15 include slots 20 to permit angle brackets 11 to pass and move longitudinally through them.

On wall 16 of lens carrier frame 3 between angle brackets 11 is cap screw 17 attaching the end of flat spring arm 18 to the housing of carrier frame 3. The other end of spring 18 is connected to pin guiding element, for example, guide roller 19, which is rotatably mounted on lens carriage 4.

Guide roller 19 is in operative contact with guide slot 21' incorporated in guide plate 21. Guide plate 21 is disposed somewhat parallel to slide rods 10 and it is positioned at an angle relative to the projection plane, which depends upon the position of longitudinally movable parallel rods 22 and 22' to which its ends are movably connected by a pin and pin slot connection. Rods 22 and 22' are longitudinally traversed in bearings 22A and 22B by contact with pins 23A and 23B on control levers 23 and 23' which are components of an automatic focusing mechanism not otherwise illustrated.

The automatic focusing mechanism provides the function of changing the focal distance of lenses 5 and 6 relative to the negative plane 7 through suitable motion transmitting elements whenever the longitudinal position of the projection head is changed relative to the projection plane. The transmission elements of the automatic focusing mechanism are illustrated herein by control levers 23 and 23' and control rods 22 and 22' in such a manner that the image projected onto the projection plane is maintained focused in any longitudinal position of the projection head. Control rods 22 and 22' are each assigned to position one of the lenses. In the illustrated embodiment, each end of the guide groove or slot 21' determines the exact operating position of lenses 5 and 6 for proper focus. Lenses 5 and 6 are movable relative to lens carrier frame 3 on lens carriage 4 which slides back and forth on guide rods 10.

When lens carriage 4 is slid along guide rods 10 during the switching between lenses 5 and 6, guide roller 19 is traversed from one end of guide plate 21 to the other end. During this movement, a corresponding longitudinal movement of lens carrier frame 3 relative to negative holder 1 and guide columns 13 is achieved in accordance with the tilt or angle of guide plate 21 relative to the projection plane. Lenses 5 and 6 are consequently longitudinally moved a corresponding amount relative to negative plane 7. In this manner the selected lens 5 or 6 in a particular case is automatically moved into the proper focal distance determined by the automatic focusing mechanism.

Guide roller 19 is alternatively biased into its end positions by toggle spring 18 in such a manner that lens carriage 4 is maintained in the particular position on slide rods 10 throughout all elevational adjustments of the projection head and resultant adjusting movements of control rods 22 and 22' of the automatic focusing mechanism.

One end of guide slot 21' is provided with an indentation 24 directed downwardly to make it even more difficult for guide roller 19 and connected lens carriage 4 to be moved from the selected end position. Guide roller 19 is securely but detachably engaged into indentation 24 by the action of toggle spring 18.

Figure 6:
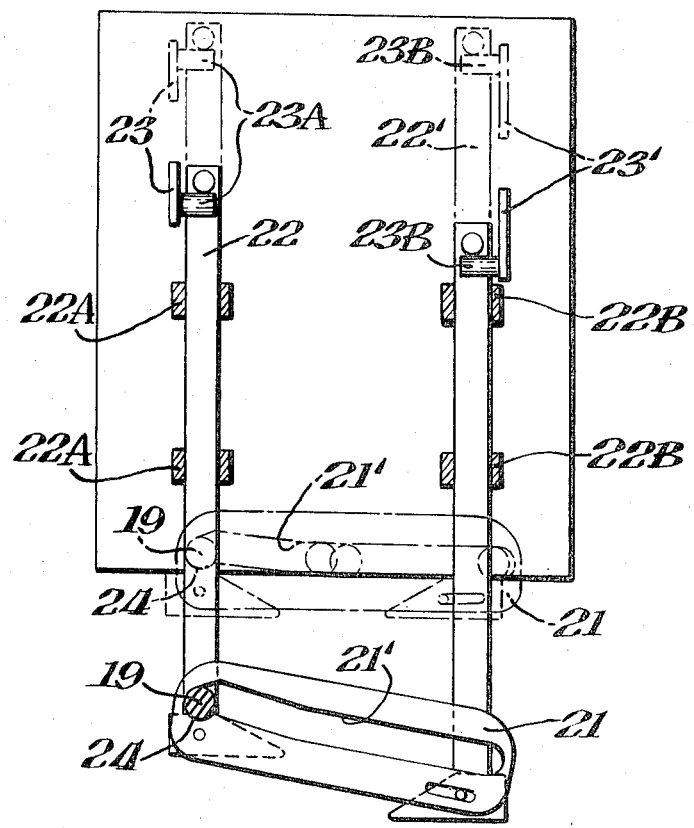
FIG. 6 is a cross-sectional view taken through FIG. 5 along the line 6—6.

FIG. 6 illustrates two positions of guide plate 21 in solid and broken outline to show different angles of tilt relative to the projection plate in response to exemplary illustrative positions of the automatic focusing mechanism.

This positioning device may also be used for positioning more than two lenses at their proper focal distances, provided that analogous provisions are made, such as intermediate or extended positions on the guide plate and slot for accommodating an additional lens or lenses.

We claim:

1. A lens positioning device for a photographic enlarger having an automatic focusing mechanism and lenses of varying focal length mounted on a lens carrier which is movably connected to a projection head comprising a lens carriage, a movable coupling connecting the lens carriage to the lens carrier for movement at right angles to the optical axis whereby one of the lenses at a time can be selectively positioned in line with the optical axis, a guide plate having a slot, a pin linkage connecting the lens carriage to the slot of the guide plate for adjusting the position of the lens carrier in directions parallel to the optical axis in response to movement of the lens carriage at right angles to the optical axis whereby the focal distance of the lens carrier is adjusted in accordance with the position of the pin in the slot, and a positioning linkage connecting the automatic focusing mechanism to the guide plate whereby the guide plate is oriented at an angle which positions the lens carrier and selected lens at its proper focal distance.

2. A device as set forth in claim 1 wherein the movable coupling comprises a slide coupling disposed at right angles to the optical axis.

3. A device as set forth in claim 2 wherein the pin linkage comprises a roller having an axis of rotation and a rotating element, the axis of rotation being connected to the lens carriage, and the rotating element being engaged with the slot.

4. A device as set forth in claim 1 wherein the movable coupling comprises a linear slide coupling, and the guide plate comprises a linear slotted link.

5. A device as set forth in claim 1 wherein the movable connection between the lens carrier and the projection head comprises columns and sleeves disposed parallel to the optical axis.

6. A device as set forth in claim 5 wherein the tops of the columns are connected to the projection head, the lower ends of the columns are supported on base plates attached to the projection head, and the base plates determine the limit of travel of the sleeves away from the projection head and the limit of travel of the lens carrier away from the projection head.

7. A device as set forth in claim 1 wherein a toggle linkage reacts between the pin linkage and the lens carrier whereby the pin is urged towards positions of said slot corresponding to proper focal distances of said lenses.

8. A device as set forth in claim 7 wherein the slot includes an indentation at a position of the slot corresponding to the proper focal distance of the selected lens.

9. A device as set forth in claim 8 wherein the toggle linkage comprises a spring arm connecting the pin linkage to the lens carrier.

10. A device as set forth in claim 9 wherein the pin linkage comprises a roller having an axis of rotation and rotating element, and the spring arm being connected to the axis of rotation.

11. A device as set forth in claim 1 wherein the automatic focusing mechanism comprises a pair of parallel movable rods disposed parallel to the optical axis, the parallel rods intersecting the position of the guide plate, and the positioning linkage comprising a motion-permitting coupling connecting the parallel rods to the guide plate.

12. A device as set forth in claim 11 wherein the parallel rods are disposed substantially at opposite ends of the guide plate.

13. A device as set forth in claim 12 wherein two lenses are provided, the ends of the slot in the guide plate comprising the positions of the pin for setting each of the lenses at the proper focal distance whereby the ends of the slot correspond to the proper focal distance for each of the lenses.

14. A device as set forth in claim 13 wherein the motion-permitting means comprises a pivot and a slotted pivot connection.

* * * * *